(12) United States Patent
Amento et al.

(10) Patent No.: US 8,908,894 B2
(45) Date of Patent: Dec. 9, 2014

(54) DEVICES AND METHODS FOR TRANSFERRING DATA THROUGH A HUMAN BODY

(75) Inventors: Brian Amento, Morris Plains, NJ (US); Kevin Ansia Li, Chatham, NJ (US); Kermit Hal Purdy, Bernardsville, NJ (US); Larry Stead, Upper Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/309,124

(22) Filed: Dec. 1, 2011

(65) Prior Publication Data

US 2013/0142363 A1 Jun. 6, 2013

(51) Int. Cl.
*H04R 25/00* (2006.01)
(52) U.S. Cl.
USPC .............................. 381/326; 381/151; 381/380
(58) Field of Classification Search
USPC ................. 381/312, 315–316, 326, 151, 380; 455/40–41, 95, 100, 106; 340/333; 379/55.1; 341/33
See application file for complete search history.

(56) References Cited

U.S. PATENT DOCUMENTS

| | | | |
|---|---|---|---|
| 3,629,521 A * | 12/1971 | Puharich et al. | 381/326 |
| 4,421,119 A | 12/1983 | Pratt | |
| 4,720,607 A | 1/1988 | de Moncuit | |
| 4,799,498 A | 1/1989 | Collier | |
| 5,073,950 A | 12/1991 | Colbert et al. | |
| 5,327,506 A | 7/1994 | Stites, III | |
| 5,368,044 A | 11/1994 | Cain et al. | |
| 5,615,681 A | 4/1997 | Ohtomo | |
| 5,766,208 A | 6/1998 | Mcewan | |
| 5,810,731 A | 9/1998 | Sarvazyan et al. | |
| 5,836,876 A | 11/1998 | Dimarogonas | |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

Zhong, L. et al., "OsteoConduct: Wireless Body-Area Communication based on Bone Conduction," Proceedings of the ICST 2nd international conference on Body area networks, BodyNets 2007.

(Continued)

*Primary Examiner* — Suhan Ni
(74) *Attorney, Agent, or Firm* — Hartman & Citrin LLC

(57) ABSTRACT

An illustrative method for transferring data to a device includes identifying the data that is to be transferred to the device, modulating the data with a signal, providing the signal to a contact microphone that is in physical contact with an individual, and transmitting the signal through a body of the individual to the device using the contact microphone. An illustrative method for authenticating the individual includes transmitting a signal through a body of the individual in response to the individual physically contacting an authentication device, receiving a modified signal including the signal as modified by the body of the individual, removing the signal from the modified signal to identify a unique body signature of the individual, comparing the unique body signature to a database to determine if the database includes the unique body signature, and selectively authenticating the individual based upon whether the database includes the unique body signature.

19 Claims, 9 Drawing Sheets

(56) References Cited

U.S. PATENT DOCUMENTS

| | | | |
|---|---|---|---|
| 6,135,951 A | 10/2000 | Richardson et al. | |
| 6,234,975 B1 | 5/2001 | Mcleod et al. | |
| 6,380,923 B1 | 4/2002 | Fukumoto | |
| 6,396,930 B1 | 5/2002 | Vaudrey et al. | |
| 6,409,684 B1 | 6/2002 | Wilk | |
| 6,507,662 B1 | 1/2003 | Brooks | |
| 6,589,287 B2 | 7/2003 | Lundborg | |
| 6,631,197 B1 | 10/2003 | Taenzer | |
| 6,754,472 B1 * | 6/2004 | Williams et al. | 455/95 |
| 6,783,501 B2 | 8/2004 | Takahashi et al. | |
| 6,844,660 B2 | 1/2005 | Scott | |
| 6,898,299 B1 | 5/2005 | Brooks | |
| 7,010,139 B1 | 3/2006 | Smeehuyzen | |
| 7,123,752 B2 | 10/2006 | Kato et al. | |
| 7,148,879 B2 | 12/2006 | Amento et al. | |
| 7,198,607 B2 | 4/2007 | Jamsen | |
| 7,206,423 B1 * | 4/2007 | Feng et al. | 381/312 |
| 7,370,208 B2 | 5/2008 | Levin et al. | |
| 7,405,725 B2 | 7/2008 | Mohri et al. | |
| 7,536,557 B2 | 5/2009 | Murakami et al. | |
| 7,539,533 B2 * | 5/2009 | Tran | 600/509 |
| 7,615,018 B2 | 11/2009 | Nelson et al. | |
| 7,625,315 B2 | 12/2009 | Hickman | |
| 7,648,471 B2 | 1/2010 | Hobson | |
| 7,671,351 B2 | 3/2010 | Setlak et al. | |
| 7,708,697 B2 | 5/2010 | Wilkinson et al. | |
| 7,760,918 B2 | 7/2010 | Bezvershenko et al. | |
| 7,796,771 B2 | 9/2010 | Calhoun et al. | |
| 7,878,075 B2 | 2/2011 | Johansson et al. | |
| 7,914,468 B2 | 3/2011 | Shalon et al. | |
| 8,023,669 B2 | 9/2011 | Segev et al. | |
| 8,023,676 B2 | 9/2011 | Abolfathi et al. | |
| 8,031,046 B2 | 10/2011 | Franza et al. | |
| 8,098,129 B2 | 1/2012 | Falck et al. | |
| 8,196,470 B2 | 6/2012 | Gross et al. | |
| 8,200,289 B2 | 6/2012 | Joo et al. | |
| 8,253,693 B2 | 8/2012 | Buil et al. | |
| 8,270,637 B2 | 9/2012 | Abolfathi | |
| 8,270,638 B2 | 9/2012 | Abolfathi et al. | |
| 8,312,660 B1 | 11/2012 | Fujisaki | |
| 8,348,936 B2 | 1/2013 | Trembly et al. | |
| 8,421,634 B2 | 4/2013 | Tan et al. | |
| 8,467,742 B2 | 6/2013 | Hachisuka et al. | |
| 8,482,488 B2 | 7/2013 | Jannard | |
| 8,491,446 B2 | 7/2013 | Hinds et al. | |
| 8,500,271 B2 | 8/2013 | Howell et al. | |
| 8,521,239 B2 | 8/2013 | Hosoi et al. | |
| 8,540,631 B2 | 9/2013 | Penner et al. | |
| 8,542,095 B2 | 9/2013 | Kamei | |
| 8,594,568 B2 | 11/2013 | Falck | |
| 8,750,852 B2 | 6/2014 | Forutanpour et al. | |
| 2001/0051776 A1 | 12/2001 | Lenhardt | |
| 2006/0018488 A1 | 1/2006 | Viala et al. | |
| 2007/0012507 A1 | 1/2007 | Lyon | |
| 2008/0260211 A1 | 10/2008 | Bennett et al. | |
| 2009/0149722 A1 | 6/2009 | Abolfathi et al. | |
| 2009/0234262 A1 | 9/2009 | Reid, Jr. et al. | |
| 2009/0289958 A1 | 11/2009 | Kim et al. | |
| 2010/0016741 A1 | 1/2010 | Mix et al. | |
| 2010/0066664 A1 | 3/2010 | Son et al. | |
| 2010/0137107 A1 | 6/2010 | Jamsa et al. | |
| 2010/0162177 A1 | 6/2010 | Eves et al. | |
| 2010/0168572 A1 | 7/2010 | Sliwa et al. | |
| 2010/0286571 A1 | 11/2010 | Allum et al. | |
| 2010/0316235 A1 | 12/2010 | Park et al. | |
| 2011/0125063 A1 | 5/2011 | Shalon et al. | |
| 2011/0134030 A1 | 6/2011 | Cho | |
| 2011/0135106 A1 | 6/2011 | Yehuday et al. | |
| 2011/0137649 A1 | 6/2011 | Rasmussen et al. | |
| 2011/0152637 A1 | 6/2011 | Kateraas et al. | |
| 2011/0227856 A1 | 9/2011 | Corroy et al. | |
| 2011/0245669 A1 | 10/2011 | Zhang | |
| 2011/0255702 A1 | 10/2011 | Jensen | |
| 2011/0269601 A1 | 11/2011 | Nelson et al. | |
| 2011/0282662 A1 | 11/2011 | Aonuma et al. | |
| 2012/0010478 A1 | 1/2012 | Kinnunen et al. | |
| 2012/0011990 A1 | 1/2012 | Mann | |
| 2012/0058859 A1 | 3/2012 | Elsom-Cook et al. | |
| 2012/0065506 A1 | 3/2012 | Smith | |
| 2012/0212441 A1 | 8/2012 | Christiansson et al. | |
| 2013/0034238 A1 | 2/2013 | Abolfathi | |
| 2013/0041235 A1 | 2/2013 | Rogers et al. | |
| 2013/0119133 A1 | 5/2013 | Michael et al. | |
| 2013/0120458 A1 | 5/2013 | Celebisoy et al. | |
| 2013/0135223 A1 | 5/2013 | Shai | |
| 2013/0171599 A1 | 7/2013 | Bleich et al. | |
| 2013/0215060 A1 | 8/2013 | Nakamura | |
| 2013/0225915 A1 | 8/2013 | Redfield et al. | |
| 2013/0288655 A1 | 10/2013 | Forutanpour et al. | |
| 2014/0028604 A1 | 1/2014 | Morinaga et al. | |
| 2014/0097608 A1 | 4/2014 | Buzhardt et al. | |
| 2014/0099991 A1 | 4/2014 | Cheng et al. | |
| 2014/0168135 A1 | 6/2014 | Saukko et al. | |
| 2014/0174174 A1 | 6/2014 | Uehara et al. | |
| 2014/0188561 A1 | 7/2014 | Tenbrock et al. | |
| 2014/0210791 A1 | 7/2014 | Hanauer et al. | |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| JP | 02249017 | 10/1990 |
| JP | 2003058190 | 2/2003 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2010045158 | 4/2010 |
| WO | WO 2012168534 | 12/2012 |

OTHER PUBLICATIONS

Scanlon, Michael V. Acoustic sensor for health status monitoring. Army Research Lab Aberdeen Proving Ground MD, 1998.

Yamada, Guillaume Lopez; Masaki Shuzo; Ichiro. "New healthcare society supported by wearable sensors and information mapping-based services." International Journal of Networking and Virtual Organisations 9.3 (2011): 233-247.

Scanlon, Michael V. "Acoustic sensors in the helmet detect voice and physiology." AeroSense 2003. International Society for Optics and Photonics, 2003.

Kompis, Martin, and Rudolf Haeusler, "Electromagnetic interference of bone-anchored hearing aids by cellular phones revisited," Acta oto-laryngologica 122.5, 2002, 510-512.

Chris Harrison, Desney Tan, Dan Morris, "Skinput: Appropriating the Skin as an Interactive Canvas," CommuniCations of the ACM 54.8, 2011, 111-118.

T. Scott Saponas, et al., "Enabling always-available input with muscle-computer interfaces," Proceedings of the 22nd Annual ACM Symposium on User Interface Software and Technology, ACM, 2009.

Jao Henrique Donker, "The Body as a communication medium," 2009.

Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

Vidya Bharrgavi, et al., "Security Solution for Data Integrity in Wireless BioSensor Networks," Distributed Computing Systems Workshops, 2007, ICDCSW'07, 27th International Conference, IEEE, 2007.

(56) References Cited

OTHER PUBLICATIONS

Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
Travis et al., "Hambone: A bio-acoustic gesture interface," 2007 11th IEEE International Symposium on Wearable Computers, 2007.
Amento et al., "The Sound of One Hand: A Wrist-Mounted Bio-Acoustic Fingertip Gesture Interface," Short Talk: It's All About Sound, CHI 2002.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.

\* cited by examiner

DEVICES AND METHODS FOR TRANSFERRING DATA THROUGH A HUMAN BODY

BACKGROUND

Wireless technologies, such as BLUETOOTH, ZIGBEE, and near-field communications ("NFC"), are typically used for short-range data transfer. The use of a wireless medium to transfer data, however, poses significant security challenges due to the susceptibility of the wireless medium to be compromised, thereby potential exposing the data to an adversary. While the aforementioned technologies are short-range in nature and, as a result, may significantly reduce the likelihood of unauthorized data reception, these technologies are also susceptible to attacks by eavesdroppers with powerful, directional antennas.

SUMMARY

Concepts and technologies are disclosed herein for transferring data through a human body. In some embodiments, using one or more piezo-electric transducers, such as contact microphones, vibrations are sent through a human body by bone conduction. Due in part to the minimal signal loss through the human body, these vibrations can be used to transfer data through the body. In some embodiments, bone conduction is used to transfer data from a first device, through a body, to a second device, wherein the body is in physical contact with both the first device and the second device. In some embodiments, bone conduction is used to transfer data from a first device with which a first user is in physical contact, through a body of the first user to a body of a second user with whom the first user is in physical contact, and then to a second device with which the second user is in physical contact. In some embodiments, bone conduction is used to transfer data from an authentication device, though a body, and back to the authentication device, which then determines a unique body signature associated with the body and allows or denies access to a person, place, or thing based upon the unique body signature. In addition or in the alternative to the use of bone conduction in these and other embodiments disclosed herein, the data or a portion thereof can be transferred along the skin of the body through skin conduction. The combination of bone and skin conduction facilitates higher data rates for data transfer through a body than relying upon bone conduction alone.

According to one aspect disclosed herein, a method for transferring data to a device includes identifying the data that is to be transferred to the device, modulating the data with a signal, providing the signal to a contact microphone that is in physical contact with an individual, and transmitting the signal through a body of the individual to the device using the contact microphone.

According to another aspect disclosed herein, a method for authenticating the individual includes transmitting a signal through a body of the individual in response to the individual physically contacting an authentication device, receiving a modified signal including the signal as modified by the body of the individual, removing the signal from the modified signal to identify a unique body signature of the individual, comparing the unique body signature to a database to determine if the database includes the unique body signature, and selectively authenticating the individual based upon whether the database includes the unique body signature.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

Figure 1:
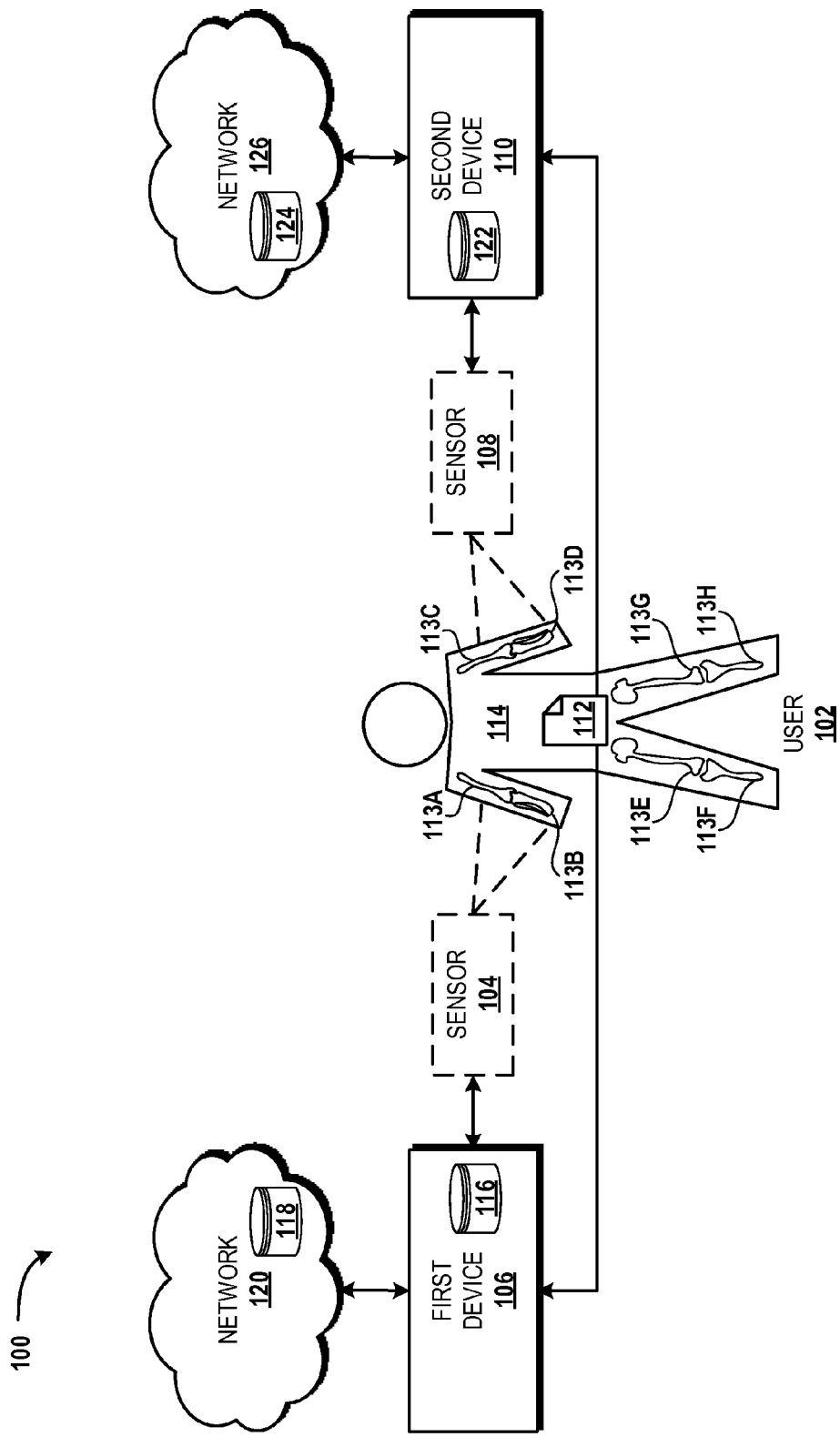
FIG. 1 is a diagram illustrating an illustrative operating environment for implementing various embodiments presented herein.

Referring now to the drawings, in which like numerals represent like elements throughout the several figures, FIG. 1 illustrates aspects of an operating environment 100 in which various embodiments presented herein may be implemented. The operating environment 100 shown in FIG. 1 includes a user 102, a first sensor 104 with which the user 102 is in physical contact, a first device 106 associated with the first sensor 104, a second sensor 108 with which the user 102 also is in physical contact, and a second device 110 associated with the second sensor 108. In some embodiments, the first device 106 provides data 112 that is to be sent to the second device 110 to the first sensor 104, which sends the data 112 through the user's body 114 to the second sensor 108, which provides the data 112 to the second device 110. Alternatively or additionally, in some embodiments, the second device 110 provides the data 112 and/or other data that is to be sent to the first device 106 to the second sensor 108, which sends the data 112 and/or other data through the body 114 to the first sensor 104, which provides the data 112 and/or other to the first device 106.

The data 112 can be any data that the user 102 desires to send from the first device 106 to the second device 110. In some embodiments, the data 112 includes, but is not limited to, contact information (e.g., name, telephone number, home address, work address, employer, alias, username, birthday, significant other, etc.), applications, photographs and/or other images, movies and/or other videos, documents, text messages, multimedia messages, and/or email messages. In some embodiments, the data 112 includes an authentication credential such as, but not limited to, a password, a pass phrase, a personal identification number, or a challenge response to a challenge question.

The data 112, in some embodiments, is sent through one or more bones 113A-113H of the body 114 by what is referred to herein as bone conduction. Bone conduction is achieved, for example, by the first sensor 104 generating vibrations that travel through the one or more bones 113A-113H of the body 114 and are received by the second sensor 108. The first sensor 104, in some embodiments, is configured to provide vibrations with amplitude, frequency, and/or phase characteristics that are determined to be appropriate for transferring the data 112 through the one or more bones 113A-113H of the body 114. Likewise, the second sensor 108, in some embodiments, is configured to receive these vibrations with the particular characteristics.

It is contemplated that different individuals may require different amplitude, frequency, and/or phase characteristics for the vibrations, so that the vibrations are able to successfully transfer data through their bodies. This is due at least in part to an individual's height, weight, body fat percentage, body muscle percentage, and/or bone characteristics such as bone density and bone mass. Other factors, such as those related to an environment in which the user 102 is located, may or may not alter the amplitude, frequency, and/or phase characteristics for the vibrations for the successful transfer of data through the body 114.

It should be understood that although the user 102 is often referred to herein as being a human, the user 102 alternatively may be any living organism that includes one or more bones through which data can be transferred using the bone conduction techniques described herein. The living organism may further include a skin that provides conductive characteristics similar to those of a human, such that the skin conduction techniques described herein may additionally be used.

It also should be understood that the user 102 may be replaced with a hard surface that has properties similar to bone or the composition of which is otherwise suitable for the transfer of data using techniques the same as or similar to those described herein for bone conduction. For example, the first device 106 and the second device 110 may be positioned on a table such that the first sensor 104 and the second sensor 108 are both in physical contact with the table so that data can be transferred from the first device 106 to the second device 110 through the table, or vice versa, using the bone conduction techniques described herein.

In some embodiments, the data 112 is sent along a skin of the body 114 by what is referred to herein as skin conduction. Skin conduction is achieved, for example, by the first sensor 104 generating an electrical signal as a primary output or as a secondary effect of a primary output that travels along the skin of the body 114 to the second sensor 108, or vice versa. With the latter, the first sensor 104 may be configured to generate vibrations that are to be sent through the body 114 using bone conduction and, in doing so, may generate an electrical signal that is sent along the skin of the body 114 to the second sensor 108. The electrical signal may or may carry the data 112. In experiments it has been determined that the combination of bone conduction and skin conduction improves the reliability of data transfer through a body and increases data transfer rates.

The first sensor 104 and/or the second sensor 108, in some embodiments, are vibration sensors that are configured to send and/or receive vibrations through the body 114 depending upon a particular configuration in accordance with the bone conduction techniques described herein. The first sensor 104 and/or the second sensor 108, in some embodiments, are piezoelectric transducers, such as contact microphones or other electro-acoustic transducers, which are configured to send and/or receive vibrations through the body 114 in accordance with the bone conduction techniques described herein. In some embodiments, the first sensor 104 and/or the second sensor 108 are skin conductance sensors that are configured to send and/or receive electrical signals over the skin of the body 114 in accordance with the skin conduction techniques described herein.

In some embodiments, the first sensor 104 and the second sensor 108 have different specifications. In some embodiments, a minimum specification is specified for sensors that are compatible with the bone conduction and/or skin conduction techniques described herein.

In the illustrated embodiment, the user 102 is positioned such that the user's body 114 is in physical contact with the first sensor 104 and the second sensor 108. It should be understood that physical contact as used herein does not specify a minimum contact area, although a minimum contact area may be specified so as to ensure the first sensor 104 and the second sensor 108 make sufficient contact with the body 114 to enable the data 112 to be successfully transferred from the first device 105 to the second device 110, or vice versa.

The first sensor 104 and the second sensor 108 may be positioned anywhere on the body 114, however, certain portions of the body 114 may be better suited for the bone conduction and/or skin conduction techniques described herein. For example, portions of the body 114 where the first sensor 104 and/or the second sensor 108 may be positioned closer to the one or more bones 113A-113H may be better suited for bone conduction. Such portions of the body 114 may include a wrist or behind an ear.

The first device 106 and/or the second device 110, in some embodiments, are computing devices such as, but not limited to, a desktop, laptop, notebook, or netbook computer, a tablet, a mobile telephone, a smartphone, a video game system, a music playback device, a video playback device, an internet appliance, a television, a monitor, a projector, an embedded computer, or a personal digital assistant. The first device 106 and/or the second device 110, in some embodiments, is a device such as, but not limited to, a keyboard, a keypad, a track pad, a touch pad, a mouse, a trackball, a joystick, a video game controller, a motion control device, a remote control device, headphones, ear buds, a hands-free communication system, a hearing aid, a door entry mechanism (e.g., a door knob), or a key fob. In some embodiments, the first device 106 and/or the second device 110 is or includes an article of clothing. In some embodiments, the first device 106 and/or the second device 110 is or includes an accessory such as, but not limited, a wallet, a purse, a bag, a backpack, an earring, a necklace, a watch, a bracelet, an anklet, a ring, a belt, or a holster.

Although the first device 106 and the second device 110 are each shown as being associated with a single sensor (i.e., the first sensor 104 and the second sensor 108, respectively), the first device 106 and the second device 110 may be associated with multiple sensors. In some embodiments, the first sensor 104 and/or the second sensor 108 are part of sensor arrays.

In some embodiments, the first sensor 104 is built-in to the first device 106. For example, the first sensor 104 may be built-in to a surface of the first device 106 such that when the user 102 holds the first device 106, at least a portion of the user's body 114 is in physical contact with the first sensor 104. The second sensor 108 may likewise configured according to these embodiments with respect to the second device 110.

In some embodiments, the first sensor 104 is operably connected to the first device 106 to receive the data 112, but is not in physical contact with the first device 106. In these embodiments, the first sensor 104 may be positioned remote from the first device 106, such as behind the ear of the user 102 while the first device 106 is in a pocket of an article of clothing on the user 102. The second sensor 108 may likewise configured according to these embodiments with respect to the second device 110.

In some embodiments, a connector may be provided within the first device 106 so as to operatively couple the first sensor 104 to the first device 106 to facilitate transmission of the data 112 from the first device 106 to the first sensor 104. In some embodiments, the first sensor 104 is self-powered. In some embodiments, the first device 106 is configured to provide power to the first sensor 104 such as through the connector. The second sensor 108 may likewise configured according to these embodiments with respect to the second device 110.

In the illustrated embodiment, the first device 106 includes a first data store 116 for storing, at least temporarily, the data 112 that is to be transferred to the second device 110. The first data store 116 may include, but is not limited to, volatile and non-volatile, removable and non-removable media implemented in any method or technology for storage of information such as computer-readable instructions, data structures, program modules, the data 112, and/or other data. For example, computer media includes, but is not limited to, random access memory ("RAM"), read-only memory ("ROM"), erasable programmable read-only memory ("EPROM"), electrically erasable programmable read-only memory ("EEPROM"), flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the data 112.

In addition to or as an alternative to storing the data 112 in the first data store 116, the first device 106, in some embodiments, stores the data 112 in a first network data store 118 that is operating on or in communication with a first network 120. In some embodiments, the data 112 is stored in the first data store 116 and backed up to the first network data store 118. In some embodiments, the data 112 is only stored in the first network data store 118 and the first data store 116 is not used or is configured to store other data.

The first network 120 may be, may communicate with, or may include a circuit-switched core network of a mobile telecommunications network, a packet-switched core network of a mobile telecommunications network, the Internet, an internet, an intranet, an enterprise network, a local area network, a wide area network, a metropolitan area network, an IP multimedia subsystem ("IMS") network, any combination thereof, and the like. Although the first device 106 is illustrated as being directly in communication with the first network 120, the first device 106 may alternatively or additionally be in communication with the first network 120 through one or more other networks (not shown).

In the illustrated embodiment, the second device 110 includes a second data store 122 for storing, at least temporarily, the data 112 after it is received from the first device 106. The second data store 122 may include, but is not limited to, volatile and non-volatile, removable and non-removable media implemented in any method or technology for storage of information such as computer-readable instructions, data structures, program modules, the data 112, and/or other data. For example, computer media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the data 112.

In addition to or as an alternative to storing the data 112 in the second data store 122, the second device 110, in some embodiments, stores the data 112 in a second network data store 124 that is operating on or in communication with a second network 126. In some embodiments, the data 112 is stored in the second data store 122 and backed up to the second network data store 124. In some embodiments, the data 112 is only stored in the second network data store 124 and the second data store 122 is not used or is configured to store other data.

The second network 126 may be, may communicate with, or may include a circuit-switched core network of a mobile telecommunications network, a packet-switched core network of a mobile telecommunications network, the Internet, an internet, an intranet, an enterprise network, a local area network, a wide area network, a metropolitan area network, an IP multimedia subsystem ("IMS") network, any combination thereof, and the like. Although the second device 110 is illustrated as being directly in communication with the second network 126, the second device 110 may alternatively or additionally be in communication with the second network 126 through one or more other networks (not shown). In some embodiments, the first network 120 and the second network 126 are the same network.

Figure 2:
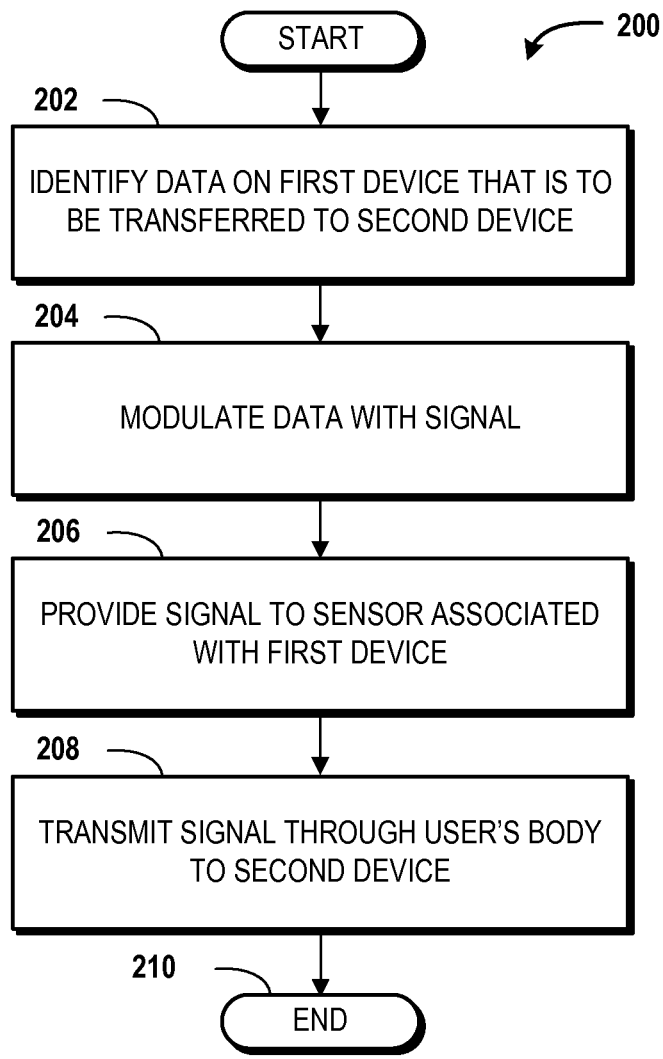
FIG. 2 is a flow diagram showing aspects of a method for transferring data to a device, according to an illustrative embodiment.

Turning now to FIG. 2, a method 200 for transferring data to a device will be described, according to an illustrative embodiment. The method 200 is described below with reference to FIG. 1. The method 200 is described such that the data 112 is transferred from the first device 106 to the second device 110, but the method 200 is equally applicable to the data 112 being transferred from the second device 110 to the first device 106.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like. In particular, computer-readable instructions can be implemented on the first sensor 104, the first device 106, the second sensor 108, and/or the second device 110.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the first device 106 identifies the data 112 that is to be transferred to the second device 110. In some embodiments, the first device 106 identifies the data 112 in response to the user selecting the data 112 for transfer to the second device 110 via a user interface of the first device 106. In some embodiments, the first device 106 identifies the data 112 at a time prior to the user 102 touching the second device 110 such that when the user 102 touches the second device 110, the first device 106 automatically initiates transfer of the data 112 to the second device 110 without additional user input. In some embodiments, the first device 106 stores the data 112 in association with an indication that the data 112 is to be transferred when the user 102 touches the sensor 108. In some embodiments, the first device 106 identifies the data 112 for transfer to the second device 110 in accordance with a syncing operation. In these embodiments, the user 102 can sync content including the data 112 and potentially other data between the first device 106 and the second device 110. In these embodiments, the second device 110 may additionally or alternatively send data to the first device 106 through the body 114 to achieve the desired synchronization.

From operation 202, the method 200 proceeds to operation 204, wherein the first device 106 modulates the data 112 with a signal. As described above, the signal may include amplitude, frequency, and/or phase characteristics that are suitable to transferring the data 112 through the body 114 via bone conduction.

From operation 204, the method 200 proceeds to operation 206, wherein the first device 106 provides the signal that includes the data to the first sensor 104. From operation 206, the method 200 proceeds to operation 208, wherein the first sensor 104 vibrates according to the signal, thereby transmitting the signal through the body 114 to the second device 110. The method 200 then proceeds to operation 210. The method 200 ends at operation 210.

In addition to transferring the data 112 using bone conduction as described above, the first sensor 104 may additionally provide an electrical signal that travels along a skin of the body 114. The electrical signal may alternatively be provided by the first sensor 104 as a result of generating the vibrations. In any case, this electrical signal may carry at least a portion of the data 112 to the second sensor 108 along the skin of the body 114.

Figure 3:
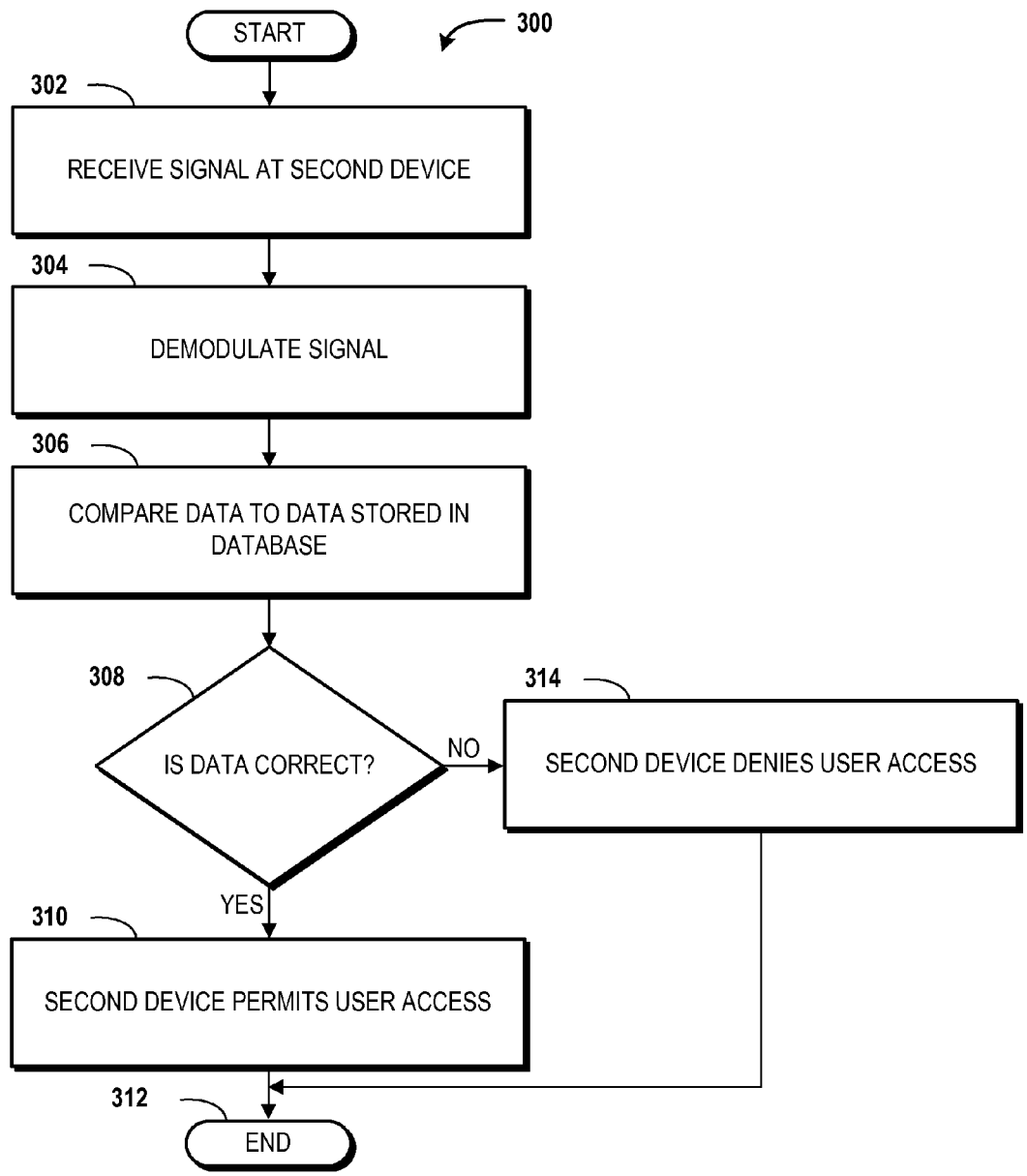
FIG. 3 is a flow diagram showing aspects of a method for authenticating a use for access to a device, according to an illustrative embodiment.

Turning now to FIG. 3, a method 300 for authenticating a user for access to a device will be described, according to an illustrative embodiment. The method 300 is described below with reference to FIG. 1. The method 300 considers embodiments in which the data 112 includes an authentication credential, such as a password. The method 300 is described such that the data 112 is received at the second device 110, but the method 300 is equally applicable to the data 112 being received at the first device 106.

The method 300 begins and proceeds to operation 302, wherein the second device 110 receives the signal from the sensor 108. From operation 302, the method 300 proceeds to operation 304, wherein the second device 110 demodulates the signal to obtain the data 112. From operation 304, the method 300 proceeds to operation 306, wherein the second device 110 compares the data 112 to data stored in the second data store 122 and/or the second network data store 124. For example, the second device 110 may receive in the data 112 a password the user 102 is providing to access the second device 110. From operation 306, the method 300 proceeds to operation 308, wherein the second device 110 determines if the data 112 is correct based upon the comparison performed at operation 306. For example, the second device 110 determines if the password is the correct password that is needed for accessing the second device 110.

If the second device 110 determines, at operation 308, that the data 112 is correct, the method 300 proceeds to operation 310, wherein the second device 110 permits the user 102 to access the second device 110. The method 300 proceeds to operations 312. The method 300 ends at operation 312.

If the second device 110 determines, at operation 308, that the data 112 is not correct, the method 300 proceeds to operation 312. The method 300 ends at operation 312.

Figure 4:
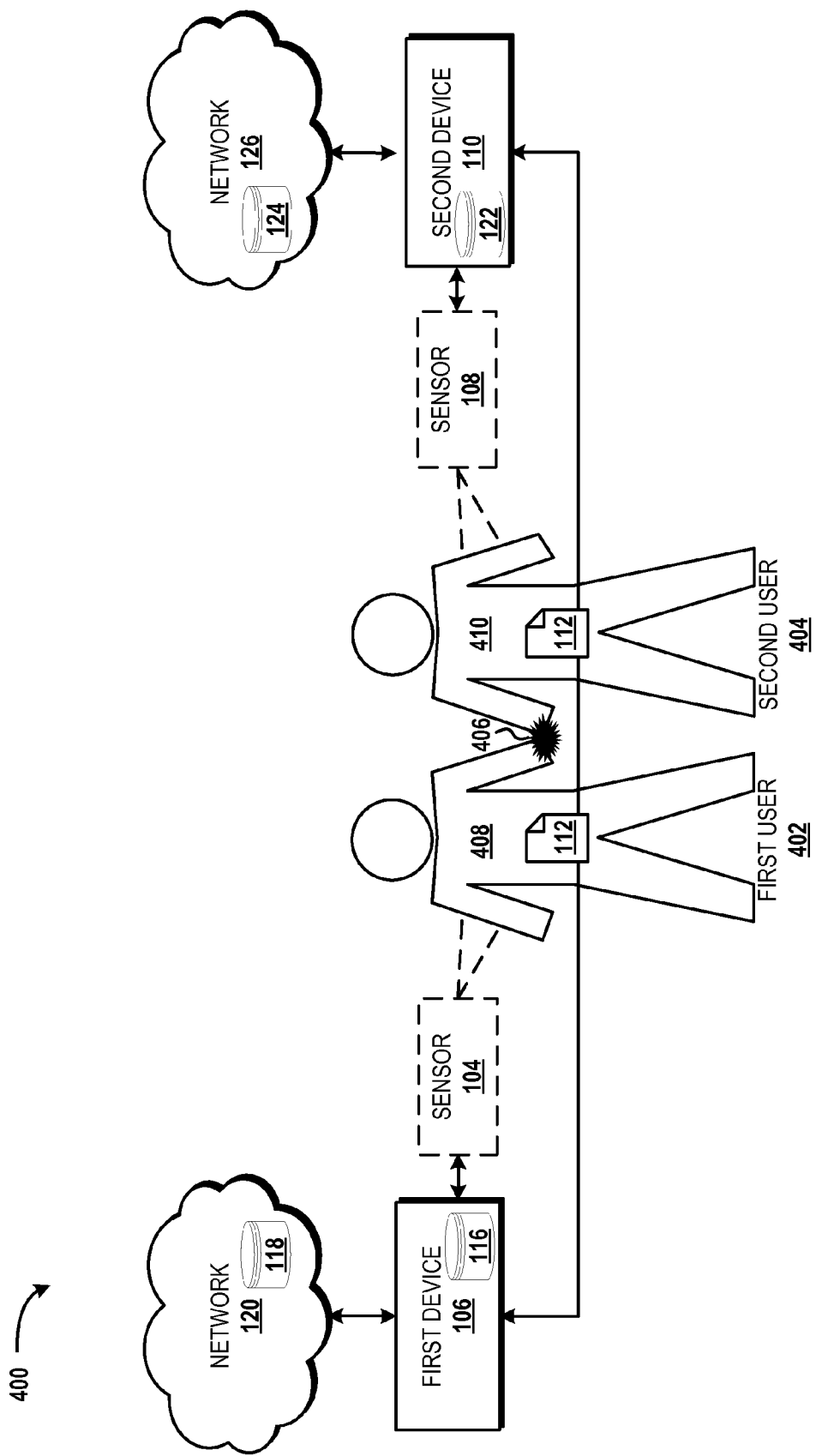
FIG. 4 is a diagram illustrating another illustrative operating environment for implementing various embodiments presented herein.

Turning now to FIG. 4, another operating environment 400 in which various embodiments presented herein may be implemented will be described. The operating environment 400 shown in FIG. 4 includes a first user 402, a second user 404, the first sensor 104 with which the first user 402 is in physical contact, a first device 106 associated with the first sensor 104, the second sensor 108 with which the second user 404 is in physical contact, and the second device 110 associated with the second sensor 108. The first user 402 is in physical contact with the second user at a contact point 406. The contact point 406, in some embodiments, is a handshake. Alternatively, in some embodiments, the contact point 406 is a tap or other touch gesture that one of the first user 402 and the second user 402 does to the other user.

It should be understood that, although two users are illustrated, data may be transferred through more than two individuals that are in physical contact. It also should be understood that the data may be transferred through more than two individuals when one or more of the individuals are in physical contact with an intermediate solid.

In some embodiments, the first device 106 provides data 112 that is to be sent to the second device 110 to the first sensor 104, which sends the data 112 through a body 408 of the first user 402 to a body 410 of the second user 404 via the contact point 406, and to the second sensor 108, which provides the data 112 to the second device 110. Alternatively or additionally, in some embodiments, the second device 110 provides the data 112 to the first device 106 in a similar manner. As such, the first user 402 can exchange data with the second user 404, such as exchanging business card information, transferring a document, or the like.

In some embodiments, a table or other intermediate solid is positioned between the first user 402 and the second user 404. In these embodiments, data can be transferred from the first device 106, through the first user 402, through the intermediate solid (not shown), through the second user 404, and to the second device 110. In some embodiments, the intermediate solid is made of an electrically conductive material and, as such, electrical signals sent along the skin of one or both of the users 402, 404 may be exchanged through it.

Figure 5:
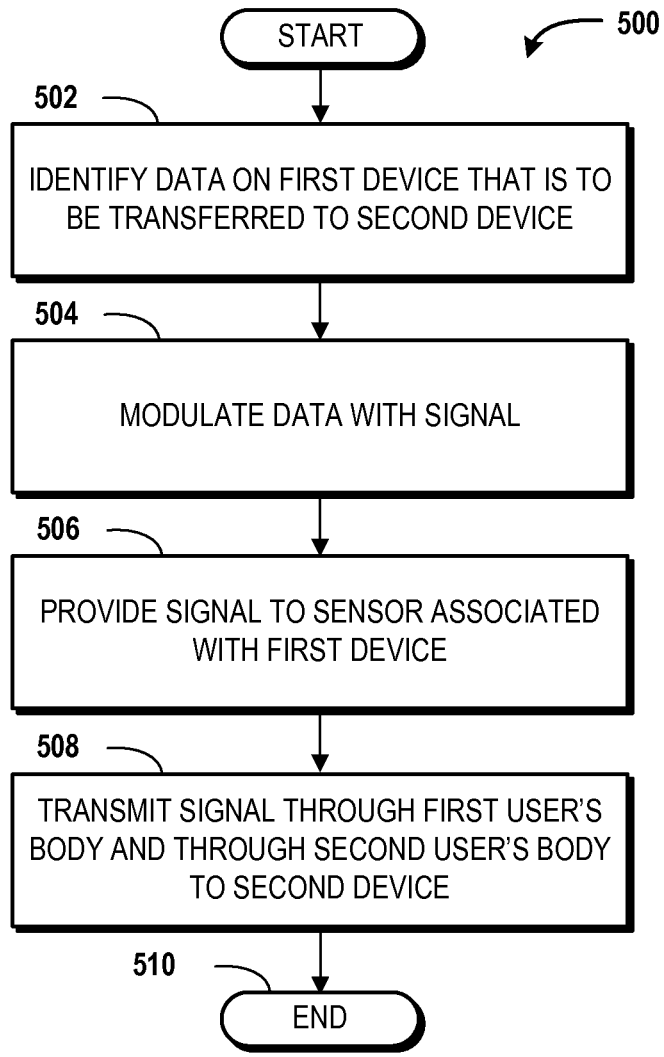
FIG. 5 is a flow diagram showing aspects of a method for transferring data between devices through multiple users, according to an illustrative embodiment.

Turning now to FIG. 5, a method 500 for transferring data between devices through multiple users will be described, according to an illustrative embodiment. The method 500 is described below with reference to FIG. 4.

The method 500 begins and proceeds to operation 502, wherein the first device 106 identifies the data 112 that is to be transferred to the second device 110. In some embodiments, the first device 106 identifies the data 112 in response to the user selecting the data 112 for transfer to the second device 110 via a user interface of the first device 106. In some embodiments, the first device 106 identifies the data 112 at a time prior to the user 102 touching the second device 110 such that when the user 102 touches the second device 110, the first device 106 automatically initiates transfer of the data 112 to the second device 110 without additional user input. In some embodiments, the first device 106 stores the data 112 in association with an indication that the data 112 is to be transferred when the user 102 touches the second sensor 108. In some embodiments, the first device 106 identifies the data 112 for transfer to the second device 110 in accordance with a syncing operation. In these embodiments, the user 102 can sync content including the data 112 and potentially other data between the first device 106 and the second device 110. In these embodiments, the second device 110 may additionally or alternatively send data to the first device 106 through the body 114 to achieve the desired synchronization.

From operation 502, the method 500 proceeds to operation 504, wherein the first device 106 modulates the data 112 with a signal. As described above, the signal may include amplitude, frequency, and/or phase characteristics that are suitable to transferring the data 112 through the body 114 via bone conduction.

From operation 504, the method 500 proceeds to operation 506, wherein the first device 106 provides the signal that includes the data to the first sensor 104. From operation 506, the method 500 proceeds to operation 508, wherein the first sensor 104 transmits the signal through the body 408 of the first user 402, to the body 410 of the second user 404 through the contact point 406, and then through the body 410 of the second user 404 to the second device 110. The method 500 then proceeds to operation 510. The method 500 ends at operation 510.

Figure 6:
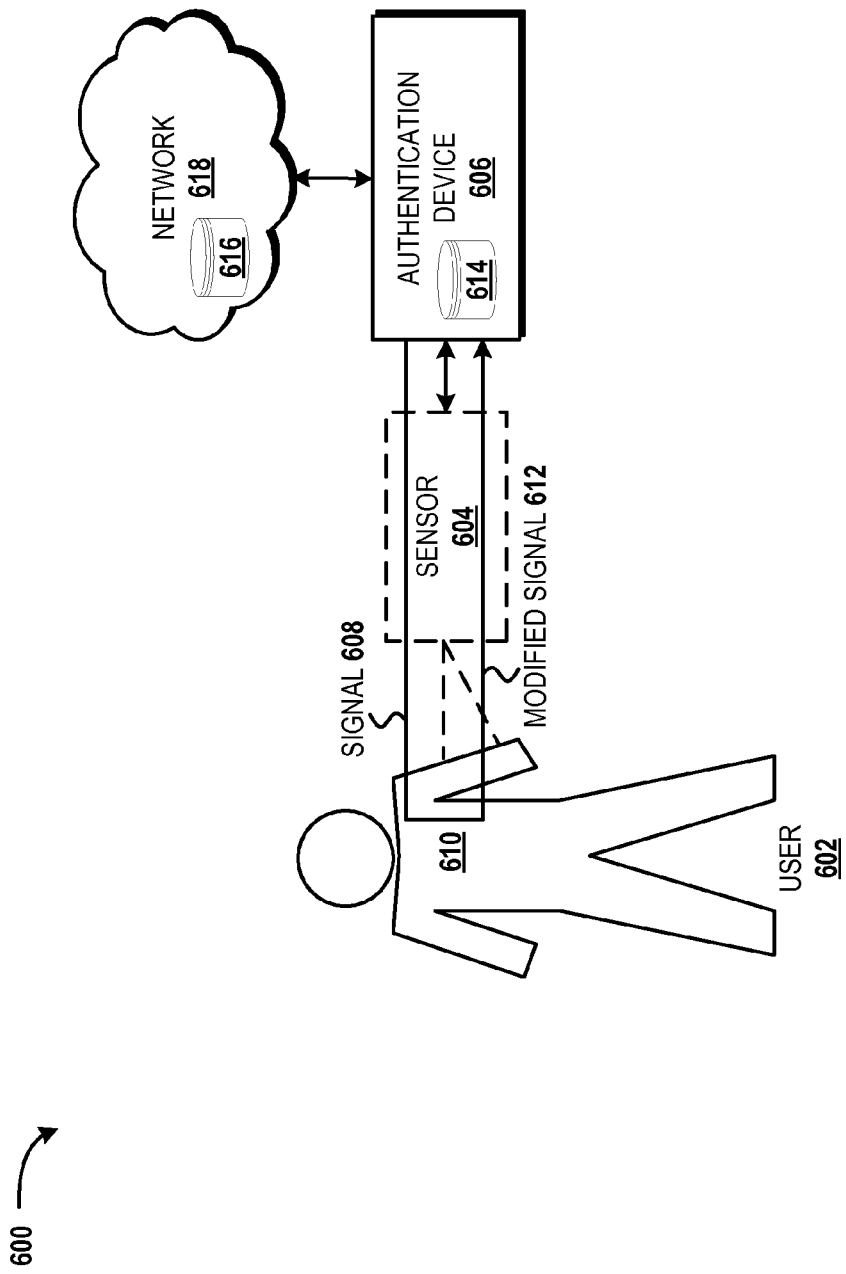
FIG. 6 is a diagram illustrating yet another illustrative operating environment for implementing various embodiments presented herein.

Turning now to FIG. 6, yet another operating environment 600 will be described for implementing various embodiments presented herein. The operating environment 600 shown in FIG. 6 includes a user 602, a sensor 604 with which the user 602 is in physical contact, and an authentication device 606 associated with the sensor 604. In some embodiments, the authentication device 606 is a device configured to authenticate the user 602 for access to another device. The other device, in some embodiments is a computing device such as, but not limited to, a desktop, laptop, notebook, or netbook computer, a tablet, a mobile telephone, a smartphone, a video game system, a music playback device, a video playback device, an internet appliance, a television, a monitor, a projector, an embedded computer, or a personal digital assistant. In some embodiments, the authentication device 606 is a device configured to authenticate the user 602 for access to a place such as a building or a room within a building. In these embodiments, the authentication device 606 may be built-in to a door knob, a door handle, or other door entry mechanism. Alternatively, in these embodiments, the authentication device 606 may be built-in to a door, or another object associated with a particular entry point to a building or room. The authentication device 606 alternatively may be or may include a keypad, a biometric sensor (e.g., a fingerprint reader, retinal scanner, etc.), a card reader, or the like.

In the illustrated embodiment, the authentication device 606 includes the authentication data store 614 for storing, at least temporarily, one or more unique body signatures. The authentication data store 614 may include, but is not limited to, volatile and non-volatile, removable and non-removable media implemented in any method or technology for storage of information such as computer-readable instructions, data structures, program modules, the unique body signature(s), and/or other data. For example, computer media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the unique body signature(s).

In addition to or as an alternative to storing the unique body signature(s) in the authentication data store 614, the authentication device 606, in some embodiments, stores the unique body signature(s) in an authentication network data store 616 that is operating on or in communication with an authentication network 618. In some embodiments, the unique body signature(s) is stored in the authentication data store 614 and backed up to the authentication network data store 616. In some embodiments, the unique body signature(s) is only stored in the authentication network data store 616 and the authentication data store 614 is not used or is configured to store other data.

The authentication network 618 may be, may communicate with, or may include a circuit-switched core network of a mobile telecommunications network, a packet-switched core network of a mobile telecommunications network, the Internet, an internet, an intranet, an enterprise network, a local area network, a wide area network, a metropolitan area network, an IMS network, any combination thereof, and the like. Although the authentication device 606 is illustrated as being directly in communication with the authentication network 618, the authentication device 606 may alternatively or additionally be in communication with the authentication network 618 through one or more other networks (not shown).

In the illustrated embodiment, the authentication device 606 is associated with a single sensor. In this embodiment, the sensor 604 is configured to send a signal 608 to the user 602, through a body 610 of the user, and then receive a modified signal 612 from the body 610. The authentication device 606 uses the modified signal 610 to identify a unique body signature for the user 602, compare the unique body signature to one or more unique body signatures stored in the authentication data store 614 and/or the network authentication data store 616, and allow or deny access to another device or a place, as the case may be, based upon whether or not the unique body signature of the user 602 is included in the authentication data store 614 and/or the network authentication data store 616.

In some embodiments, the authentication device 606 is associated with two sensors. In these embodiments, one of the sensors is used to send the signal 608 and the other is used to receive the modified signal 612. As such, in these embodiments, the body 610 of the user 602 is in physical contact with both sensors.

The sensor 604, in some embodiments, is a vibration sensor that is configured to send and/or receive vibrations through the body 610 depending upon a particular configuration. The sensor 604, in some embodiments, is a piezoelectric transducer, such as contact microphones, that are configured to send and/or receive vibrations through the body 610 in accordance with the bone conduction techniques described herein. In some embodiments, the sensor 604 is a skin conductance sensor that is configured to send and/or receive electrical signals over the skin of the body 610.

In some embodiments, the sensor 604 is built-in to the authentication device 606. For example, the sensor 604 may be built-in to a surface of the authentication device 606 such that when the user 602 touches the authentication device 606, at least a portion of the user's body 610 is in physical contact with the sensor 604.

In some embodiments, the sensor 604 is operably connected to the authentication device 606, but is not in physical contact with the authentication device 606. In these embodiments, the sensor 604 may be remotely positioned from the first device 106, such as on a door knob, while the authentication device 606 is located elsewhere, such as in a keypad, a security camera, a security station, or other location that is remote to the door knob.

In some embodiments, a connector may be provided within the authentication device 606 so as to operatively couple the sensor 604 to the authentication device 606. In some embodiments, the sensor 604 is self-powered. In some embodiments, the authentication device 606 is configured to provide power to the sensor 604 such as through the connector.

Figure 7:
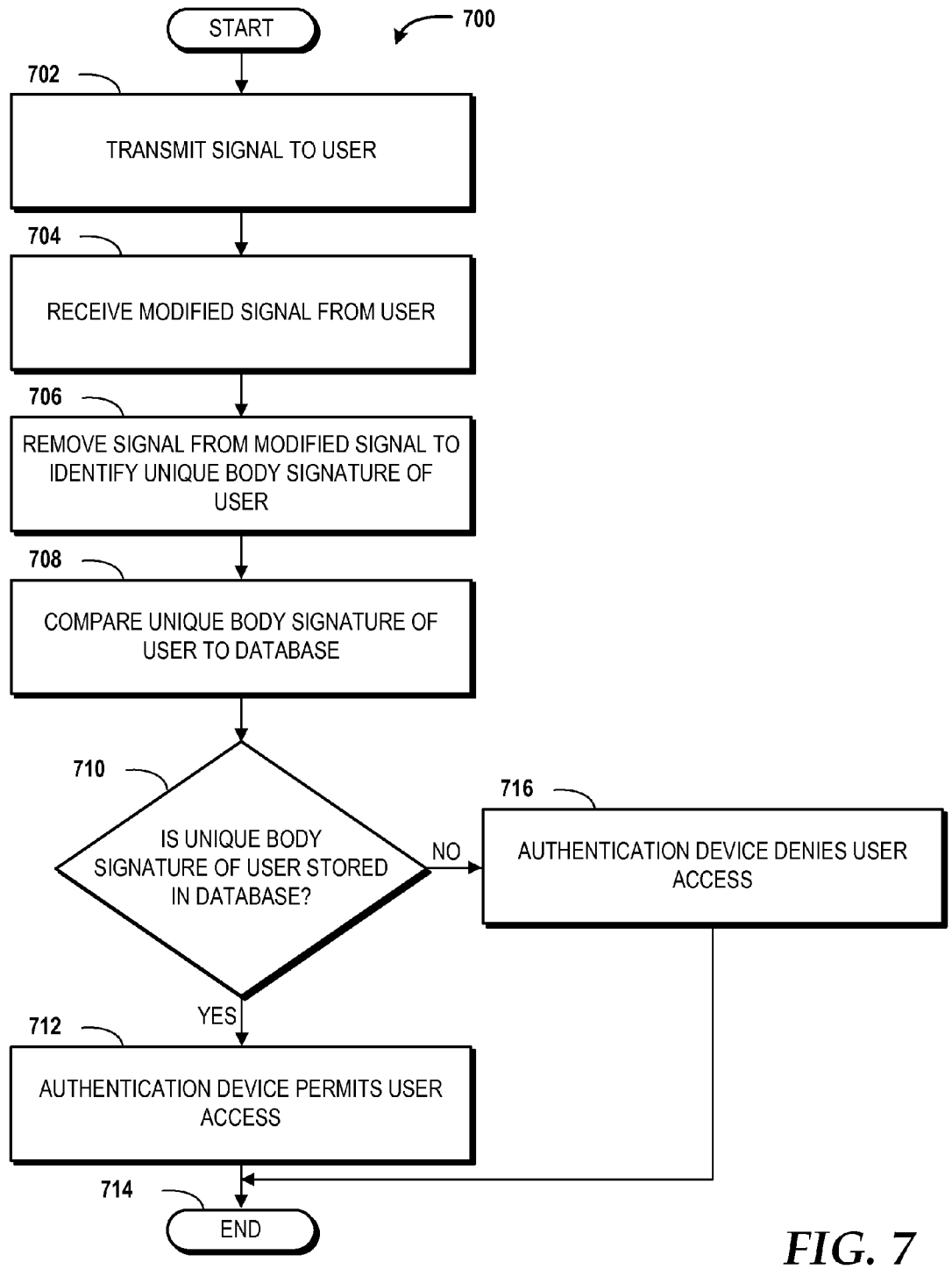
FIG. 7 is a flow diagram showing aspects of another method for authenticating a user to access a device, according to an illustrative embodiment.

Turning now to FIG. 7, a method 700 for authenticating a user to access a device or a place will be described, according to an illustrative embodiment. The method 700 is described below with reference to FIG. 6.

The method 700 begins and proceeds to operation 702, wherein the authentication device 606 transmits the signal 608 to the user 602. From operation 702, the method 700 proceeds to operation 704, wherein the authentication device 606 receives the modified signal 612 from the body 610 of the user 602. From operation 704, the method 700 proceeds to operation 706, wherein the authentication device 606 removes the signal 608 from the modified signal 612 to identify a unique body signature of the user 602. From operation 706, the method 700 proceeds to operation 708, wherein the authentication device 606 compares the unique body signature of the user 602 to one or more unique body signatures stored in the authentication data store 614 and/or the authentication network data store 616. The method 700 then proceeds to operation 710, wherein the authentication device 606 determines if the unique body signature of the user 602 as identified at operation 706 is stored in the authentication data store 614 and/or the authentication network data store 616.

If the authentication device 606 determines, at operation 710, that the unique body signature of the user 602 is stored in the authentication data store 614 and/or the authentication network data store 616, the method 700 proceeds to operation 712, wherein the authentication device 606 permits user access to the device or place for which the authentication device 606 is used to provide authenticated access. The method 700 then proceeds to operation 714. The method 700 ends at operation 714.

If the authentication device 606 determines, at operation 710, that the unique body signature of the user 602 is not stored in the authentication data store 614 and/or the authentication network data store 616, the method 700 proceeds to operation 716, wherein the authentication device 606 denies user access to the device or place for which the authentication device 606 is used to provide authenticated access. The method 700 then proceeds to operation 714. The method 700 ends at operation 714.

In some embodiments, one or more of the sensors 104, 108, 604 are calibrated prior to being used in the aforementioned methods. In some embodiments, the calibration process is designed such that environmental and other factors that may inhibit or enhance the ability for vibrations to be sent through bone of an individual and/or along the skin of the individual may be reasons for performing a calibration process. In some embodiments, the calibration process facilitates the selection of bone conduction, skin conduction, or both. For example, the calibration process may provide an option that permits signals to be sent through the bone using vibrations and avoid factors that inhibit or enhance the skin conduction techniques disclosed herein.

It should be understood that the use of the sensors 104, 108, 604 for bone and/or skin conduction is not limited to the uses described herein above. In some embodiments, one or more of the sensors 104, 108, 604 are used to establish a presence for an individual. For instance, when a device that includes one or more of the sensors 104, 108, 604 is being handled by an individual, the presence for that user can be detected by the ability of the sensor and the individual's presence can be updated to available. Similarly, if the device is at rest on a table and the individual is in physical contact with the table, the individual's presence can be updated to available because the sensor is capable of transmitting a signal through the table and then through the individual.

A principle similar to the one described above can be applied to other implementations in which the concept of presence is appropriate, but may not necessarily be reflected for the purposes of communication presence. For instance, one or more of the sensors 104, 108, 604 can be included in a steering wheel. When an individual touches the steering wheel, the steering wheel or other component of a vehicle can interact with the individual's mobile device to disable certain features such as, for example, voice calling or text messaging. Alternatively, the mobile device may communicate with the car to disengage the starter or otherwise prevent the engine from starting or the car from being driven.

Figure 8:
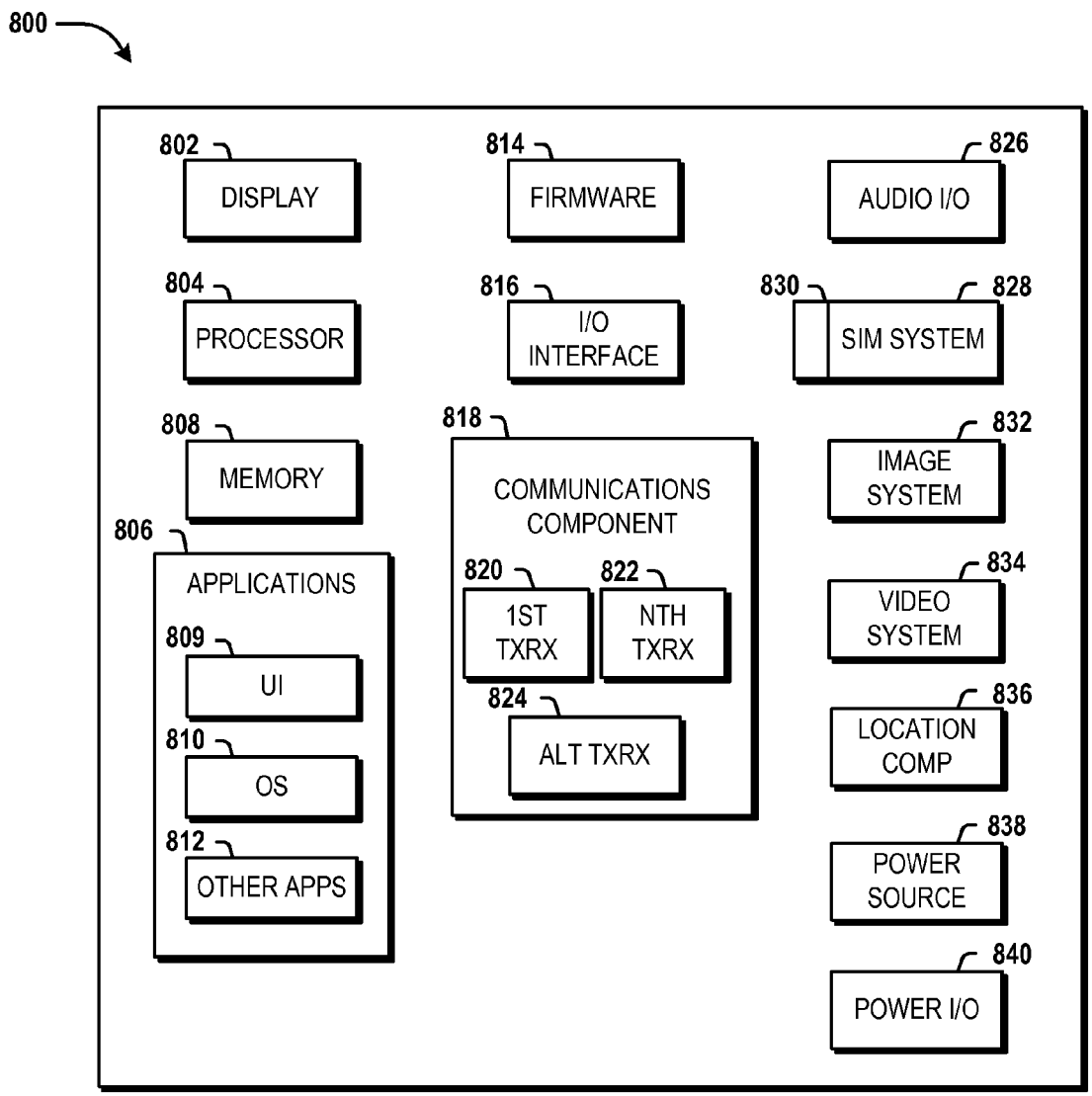
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented. The first device 106, the second device 110, and/or the authentication device 606 described herein above may be configured like the mobile device 800. It should be understood that the mobile device may include additional functionality or include less functionality than now described.

As illustrated in FIG. 8, the mobile device 800 includes a display 802 for visually displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 800 also includes a processor 804 for processing data and/or executing computer-executable instructions of one or more applications 806 stored in a memory 808. In some embodiments, the applications 806 include a UI application 809. The UI application 809 interfaces with an operating system ("OS") application 810 to facilitate user interaction with device functionality and data. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 809 aids a user in activating service over-the-air, if applicable, entering message content, viewing received messages, answering/initiating calls, entering/deleting data, entering and setting user IDs and passwords for device access, configuring settings, manipulating contacts database content and/or settings, multimode interaction, interacting with other applications 812, and otherwise facilitating user interaction with the OS application 812 and the other applications 812.

In some embodiments, the other applications 812 include bone and/or skin conduction applications configured to perform the various embodiments described herein. In some embodiments, the other applications 812 include, for example, presence applications, visual voicemail applications, messaging applications, text-to-speech and speech-to-text applications, add-ons, plug-ins, email applications, music applications, video applications, camera applications, location-based service applications, navigation applications, power conservation applications, game applications, productivity applications, entertainment applications, enterprise applications, combinations thereof, and the like. The applications 806 or portions thereof are stored in the memory 808 and/or in a firmware 814, and are executed by the processor 804. The firmware 814 may also store code for execution during device power up and power down operations. In some embodiments, the OS 810 or a portion thereof, such as a kernel, is stored in the firmware 814.

The mobile device 800 also includes an input/output ("I/O") interface 816 for the input/output of data such as location information, presence status information, user IDs, passwords, application initiation (start-up) requests, and other input/output of data associated with the embodiments disclosed herein. In some embodiments, the I/O interface 816 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks. In some embodiments, the one or more networks includes networks that utilize a cellular wireless technology. In some embodiments, one or more networks include networks that utilize non-cellular wireless technologies such as WI-FI or WIMAX. In some embodiments, the communications component 818 includes a multimode communications subsystem for facilitating communications via a cellular network and one or more WI-FI, WIMAX or other non-cellular wireless network.

The communications component 818, in some embodiments, includes one or more transceivers each configured to communicate over the same or a different wireless technology standard. For example, the transceivers of the communications component 818 may be configured to communicate using Global System for Mobile communications ("GSM"), Code Division Multiple Access ("CMDA") One ("CDMA-ONE"), CDMA2000, Long Term Evolution ("LTE"), and various other 2G, 2.5G, 3G, 4G, and greater generation technology standards. Moreover, the communications component 818 may facilitate communications over various channel access methods (which may or may not be used by the aforementioned standards) including, but not limited to, Time Division Multiple Access ("TDMA"), Frequency Division Multiple Access ("FDMA), Wideband CDMA ("W-CDMA"), Orthogonal Frequency Division Multiplexing ("OFDM"), Space-Division Multiple Access ("SDMA"), and the like. In addition, the communications component 818 may facilitate data communications using General Packet Radio Service ("GPRS"), Enhanced Data Rates for GSM Evolution ("EDGE"), the High Speed Packet Access ("HSPA") protocol family including High Speed Downlink Packet Access ("HSDPA"), Enhanced Uplink ("EUL") or otherwise termed High Speed Uplink Packet Access ("HSUPA"), HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, infrared data association ("IRDA"), near field communications ("NFC"), other RF, combinations thereof, and the like. In some embodiments, the communications component 818 also facilitates reception from terrestrial radio networks, digital satellite radio networks, internet-based radio service networks, combinations thereof, and the like.

The communications component 818 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a universal subscriber identity module ("USIM") system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The mobile device 800 may also include an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to a multimedia message service ("MMS") message and sent to another mobile device.

The illustrated mobile device 800 also includes a location component 836 for sending and/or receiving signals such as global positioning system ("GPS") data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

Figure 9:
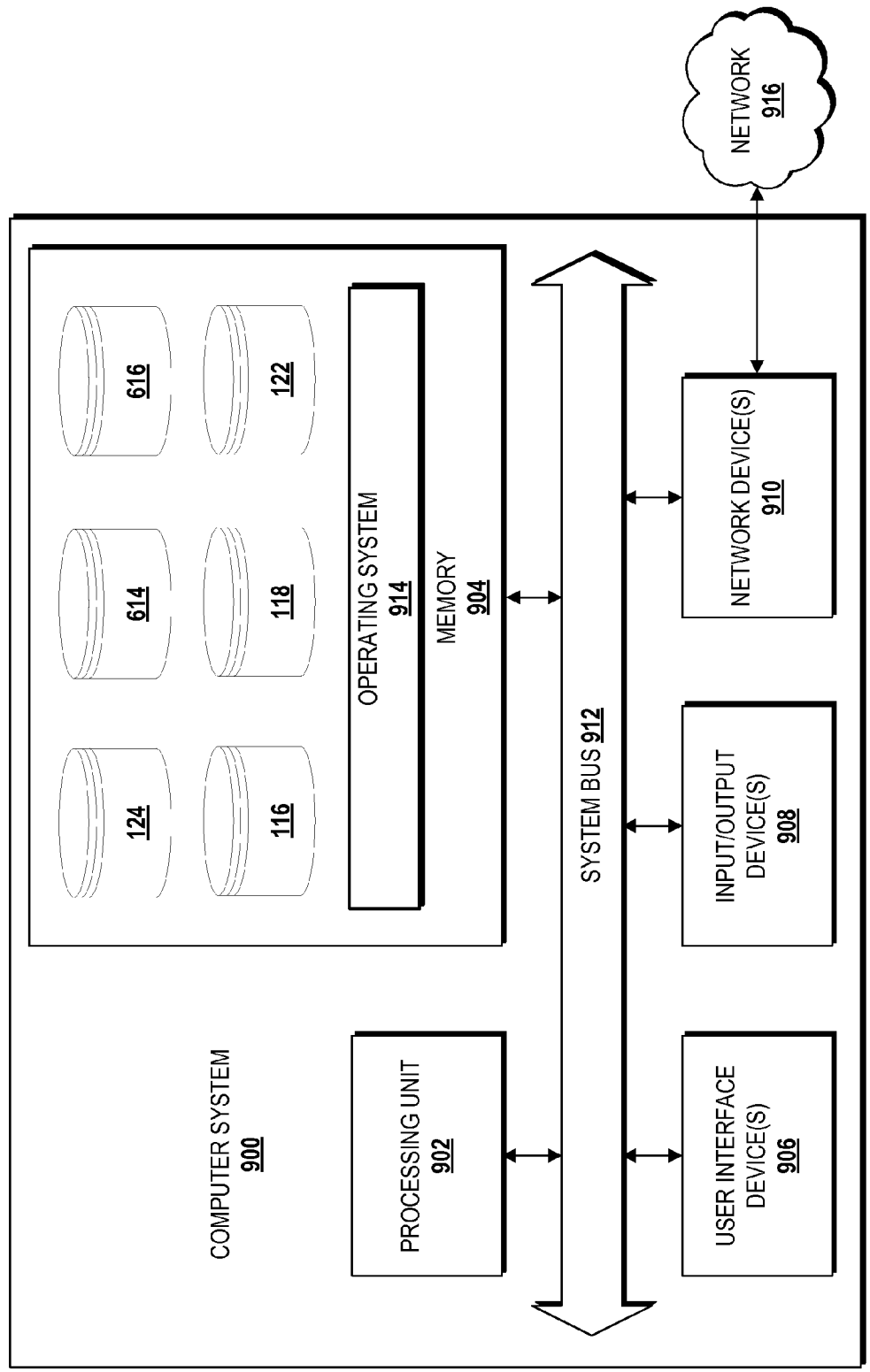
FIG. 9 is a computer architecture diagram illustrating an illustrative computer hardware and software architecture for a computing system capable of implementing aspects of the embodiments presented herein.

FIG. 9 is a block diagram illustrating a computer system 900 configured to perform various operations disclosed herein. The first device 106, the second device 110, the authentication device 606, and/or one or more server computer or other computer systems operating on or in communication with the first network 120, the second network 126, or the authentication network 618, in some embodiments, are configured like the computer system 900.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the computer system 900. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The illustrated memory 904 includes an operating system 914, the first data store 116, the first network data store 118, the second data store 122, the second network data store 124, the authentication data store 614, and the authentication network data store 616.

The operating system 914 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 906 may include one or more devices with which a user accesses the computer system 900. The user interface devices 906 may include, but are not limited to, computers, servers, personal digital assistants, telephones (e.g., cellular, IP, or landline), or any suitable computing devices. The I/O devices 908 enable a user to interface with the program modules. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 916, such one of the networks 120, 126, 618 described herein above. Examples of the network devices 910 include, but are not limited to, a modem, a radio frequency ("RF") or infrared ("IR") transceiver, a telephonic interface, a bridge, a router, or a network card. The network 1220 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 922 may be a wired network such as, but not limited to, a wide area network ("WAN") such as the Internet, a local area network ("LAN") such as the Ethernet, a wired personal area network ("PAN"), or a wired metropolitan area network ("MAN").

The network 916 embodied as a cellular network may utilize a mobile telecommunications technology such as, but not limited to, Global System for Mobile communications ("GSM"), Universal Mobile Telecommunications System ("UMTS"), Code Division Multiple Access ("CDMA") ONE, CDMA2000, Long-Term Evolution ("LTE"), and various other 2G, 2.5G, 3G, 4G, and greater generation mobile telecommunications technologies. In addition, mobile data communications technologies such as General Packet Radio Service ("GPRS"), Enhanced Data Rates for GSM Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), HSPA+, and various other current and future mobile data communications technologies are contemplated for use by the network 916. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the MD 800. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for data transfer and authentication utilizing bone and/or skin conduction have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising:
    modulating, by a first device, an authentication credential with a signal;
    providing, by the first device, the signal to an electro-acoustic transducer that is in physical contact with an individual; and
    causing, by the first device, the electro-acoustic transducer to transmit the signal through a bone of a body of the individual to a second device with which the individual is also in physical contact, so that the second device can authenticate the individual for access to the second device based upon the authentication credential.

2. The method of claim 1, the second device comprises a door entry mechanism, the door entry mechanism requiring the authentication credential for access thereto.

3. The method of claim 1, wherein causing, by the first device, the electro-acoustic transducer to transmit the signal through the body of the individual to the second device comprises causing, by the first device, the electro-acoustic transducer to transmit the signal along a skin of the body of the individual to the second device.

4. The method of claim 1, wherein causing, by the first device, the electro-acoustic transducer to transmit the signal through the bone of the body of the individual to the second device comprises causing, by the first device, the electro-acoustic transducer to transmit a first portion of the signal through the bone of the body of the individual to the second device and a second portion of the signal along a skin of the body of the individual to the second device, and wherein the electro-acoustic transducer is a contact microphone.

5. The method of claim 1, wherein the second device comprises a computing device.

6. The method of claim 1, wherein providing, by the first device, the signal to the electro-acoustic transducer comprises providing, by the first device, the signal to the electro-acoustic transducer that is in physical contact with the individual automatically in response to the physical contact without additional input.

7. A method comprising:
- in response to an individual touching a sensor associated with an authentication device, transmitting, by the sensor associated with the authentication device, a signal through a body of the individual;
- receiving, by the sensor associated with the authentication device, a modified signal from the body of the individual, the modified signal comprising the signal as modified by the body of the individual;
- identifying, by the authentication device, a unique body signature of the individual by removing the signal from the modified signal;
- comparing, by the authentication device, the unique body signature of the individual to a plurality of unique body signatures stored in a database to determine if the database comprises the unique body signature;
- if the authentication device determines that the database comprises the unique body signature, authenticating, by the authentication device, the individual; and
- if the authentication device determines that the database does not comprise the unique body signature, denying authentication of the individual.

8. The method of claim 7, wherein the sensor comprises a contact microphone.

9. The method of claim 8, wherein transmitting, by the contact microphone associated with authentication device, the signal through the body of the individual comprises transmitting, by the contact microphone associated with the authentication device, the signal through a bone of the individual.

10. The method of claim 9, wherein transmitting, by the contact microphone of the authentication device, the signal through the bone of the individual comprises transmitting, by the contact microphone of the authentication device, a first portion of the signal through the bone of the individual, and further comprising transmitting, by a skin conductance sensor, a second portion of the signal along a surface of a skin of the body of the individual.

11. The method of claim 7, further comprising, prior to transmitting the signal through the body of the individual:
- transmitting, by the sensor of the authentication device, a unique body signature creation signal through the body of the individual;
- retrieving, by the sensor of the authentication device, the unique body signature from the unique body signature creation signal after the unique body signature creation signal is transmitted through the body of the individual; and
- storing the unique body signature of the individual in the database.

12. The method of claim 7, wherein the database is stored in one of the following: a local memory of the authentication device and a remote memory accessible by the authentication device.

13. An authentication device comprising:
- a processor; and
- a memory that stores instructions which, when executed by the processor, cause the processor to perform operations comprising
  - in response to an individual touching a sensor associated with the authentication device, causing the sensor associated with the authentication device to transmit a signal through a body of the individual,
  - receiving a modified signal from the body of the individual, the modified signal comprising the signal as modified by the body of the individual,
  - identifying a unique body signature of the individual by removing the signal from the modified signal,
  - comparing the unique body signature of the individual to a plurality of unique body signatures stored in a database to determine if the database comprises the unique body signature,
  - if the database comprises the unique body signature, authenticating the individual, and
  - if the database does not comprise the unique body signature, denying authentication of the individual.

14. The authentication device of claim 13, wherein the memory further comprises the database storing the plurality of unique body signatures.

15. The authentication device of claim 13, wherein the sensor comprises a contact microphone that transmits the signal through a bone of the body of the individual in response to physical contact from the individual.

16. The authentication device of claim 13, wherein the sensor comprises a contact microphone that transmits the signal through a bone of the body of the individual and along a skin of the body of the individual in response to physical contact from the individual.

17. The authentication device of claim 13, wherein the operations further comprise, prior to transmitting the signal through the body of the individual:
- transmitting a unique body signature creation signal through the body of the individual;
- retrieving the unique body signature from the unique body signature creation signal after the unique body signature creation signal is transmitted through the body of the individual; and
- storing the unique body signature of the individual in the database.

18. The authentication device of claim 13, wherein the authentication device is built-in to a door entry mechanism.

19. The authentication device of claim 13, wherein the authentication device is built-in to an entry point.

* * * * *